May 14, 1957 S. FÜRST 2,791,874
APPARATUS FOR BEADING TRAVELER SPLIT RINGS
Filed March 10, 1954

INVENTOR.
Stefan Fürst
BY

United States Patent Office 2,791,874
Patented May 14, 1957

2,791,874

APPARATUS FOR BEADING TRAVELER SPLIT RINGS

Stefan Fürst, M. Gladbach, Rhineland, Germany, assignor to Reiners & Fürst, M. Gladbach, Rhineland, Germany Application March 10, 1954, Serial No. 415,323

Claims priority, application Germany March 11, 1953

13 Claims. (Cl. 53—197)

The present invention relates to a method and apparatus for beading traveler split rings and similar objects onto elongated carrier members.

Devices for attaching traveler split rings to spinning rings are known in which magazines carrying a set of traveler split rings are used. Such magazines are elongated carrier members having a cross section corresponding to the shape of the traveler split ring and carry a set of traveler split rings beaded thereon in a position in which the traveler split rings are arranged with their spaced ends aligned.

It is one object of the present invention to provide a method and apparatus for automatically attaching traveler split rings to an elongated carrier member in a position in which the spaced ends of all traveler split rings are aligned.

It is another object of the present invention to provide an apparatus for automatically attaching objects to a carrier member by dropping the objects onto the carrier member, and to provide means for returning objects not caught on the carrier member to a higher position from which they are again dropped onto the carrier member.

It is a further object of the present invention to provide means for stripping improperly positioned traveler split rings off a carrier member on which traveler split rings are dropped.

It is also an important object of the present invention to provide a method and an apparatus for automatically beading annular objects onto carrier members in an inexpensive and rapid operation.

With these objects in view, the present invention mainly consists in a method for beading traveler split rings having spaced ends onto an elongated carrier member and comprises the steps of dropping the traveler split rings onto the upper ends of upright carrier members; and moving a stripping member along each carrier member towards its upper end and in a plane passing through said carrier member so that traveler split rings whose spaced ends are located on both sides of said plane are retained on the carrier member, whereas traveler split rings caught on the carrier member in angularly displaced positions are lifted off the carrier member.

The apparatus according to the present invention for attaching objects to an elongated carrier member mainly comprises, in combination, supply means having a discharge portion adapted to drop objects toward at least one carrier member located underneath the discharge portion, conveyer means having a lower receiving portion located underneath the discharge portion of the supply means and a higher delivery portion located above the supply means, the conveyer means being adapted to transport objects dropped from the discharge portion onto the lower receiving portion back to the supply means so that those objects dropped from the discharge portion which are not caught by and attached to the carrier member are returned to the supply means for repeated discharge therefrom.

Preferably the supply means include a hollow rotary drum having outlet openings, and an inclined supply table which receives the objects from the hollow drum. The objects, such as traveler split rings, move downwardly on the inclined supply table and drop from the lower end of the table onto the carrier member. The supply table is preferably vibrated for better distribution of the traveler split ring over the table.

According to a preferred embodiment of the present invention the carrier members are supported in upright position so that they engage with their upper ends the lower ends of upright guiding members which have pointed upper ends for catching traveler split rings dropped from the discharge portion of the supply means.

Since it is of importance that the traveler split rings are beaded on the carrier members with their ends aligned, a rotary stripping member is preferably provided for each guiding member and has a projecting portion passing along the guiding member, or along the carrier member, toward the upper end thereof. The projecting portion of the stripping member is narrow and passes between the spaced ends of split rings which are properly aligned. Traveler split rings which are angularly displaced so that their openings are not aligned with the openings of properly positioned traveler split rings, are lifted by the stripping member off the guiding member and drop onto the conveyer means which return them to the supply means.

If no pointed guiding members are provided, the rotary stripping member is arranged to move along the carrier member, and to lift improperly positioned traveler split rings off the upper end of the carrier member.

In the event that a hollow drum receives the supply of traveler split rings, the conveyer means drop returned traveler split rings onto a chute over which the traveler split rings slide into the hollow drum. A similar chute is preferably provided underneath the discharge portion of the supply means and underneath the stripping member for receiving traveler split rings not caught by the pointed guiding members, or by the carrier members, respectively. The last mentioned chute guides dropped traveler split rings to the lower receiving portion of the conveyer means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
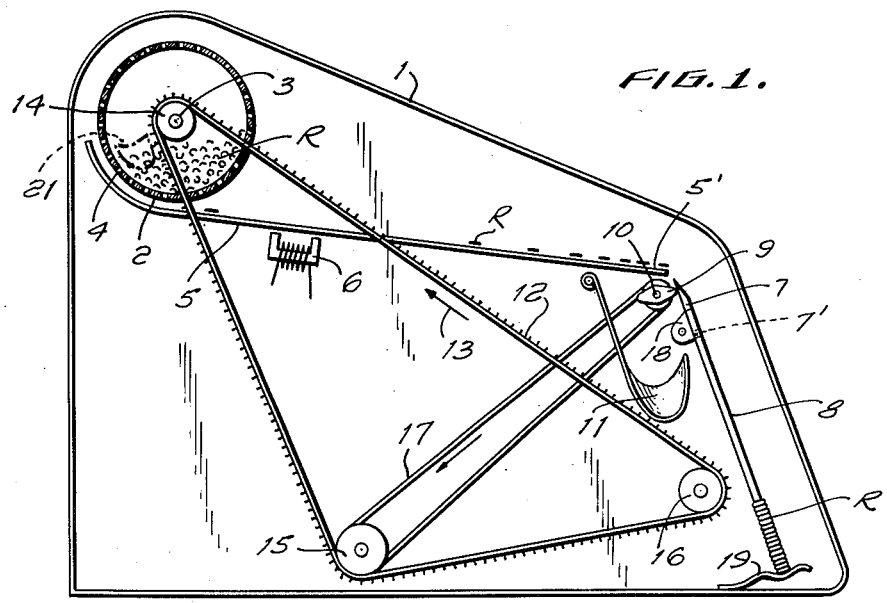
Fig. 1 is a side view of a preferred embodiment of the present invention.
Figure 2:
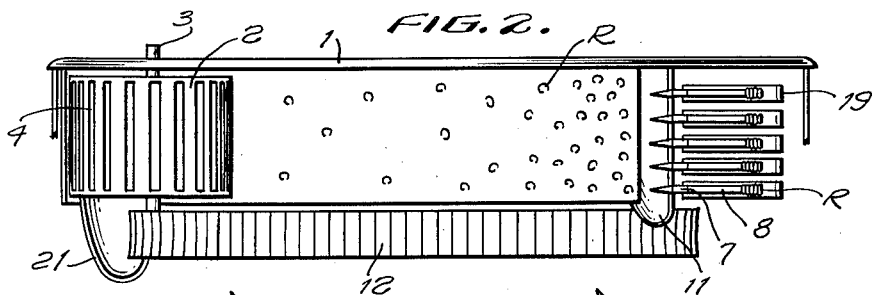
Fig. 2 is a plan view of the embodiment shown in Fig. 1.
Figure 4:
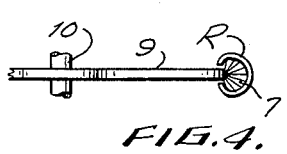
Fig. 4 is a plan view to Fig. 3.

Referring now to the drawing and more particularly to Figs. 1 and 2, a drum 2 is turnably mounted in a housing 1 on a shaft 3. The drum 2 is hollow and provided with circumferentially spaced slots or openings 4. Underneath the drum 2, an inclined supply table 5 is arranged which is vibrated by means of the electro-magnetic vibrator 6. Traveler split rings R, or similar objects, are filled into drum 2, and it will be apparent that rotation of the drum will cause the traveler split rings R to pass through the slots 4 onto the inclined supply table 5 over which there will be scattered to slide downwardly to the lower edge of the supply table 5 which constitutes a discharge portion 5'. The shape of a traveler split ring R is best seen in Fig. 4. It will be noted that each traveler split ring R has two spaced ends which define an opening.

Figure 3:
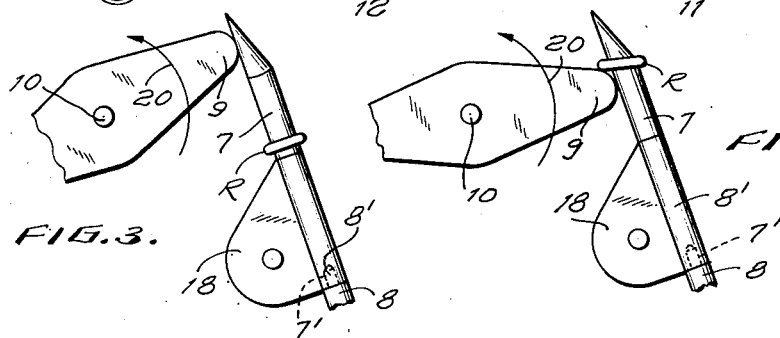
Fig. 3 is a front view of a detail.

Underneath the discharge portion 5' of the supply means 4, 5, pointed guiding members 7 are arranged in an upright position so that the pointed ends thereof are adapted to catch traveler split rings dropping over the lower edge 5' of the supply table. The lower ends of the guiding members 7 are provided with recesses 7' for receiving a projection 8' of the elongated carrier members 8 as will be best seen from Figs. 3 and 5. The lower ends of the elongated carrier members 8 are supported on a resilient supporting means 19 so that projections 8' are pressed into recesses 7'. Since the guiding members 7 are secured to the housing 1 by means of the brackets 18, the upright position of the carrier members 8 is defined.

A number of traveler split rings R are shown to be beaded on the lower end portions of the carrier members 8 in Figs. 1 and 2, and it will be understood that, as further traveler members are dropped onto the pointed ends of the guide members 7, the entire length of the carrier members 8 will be taken up by traveler split rings.

However, since the carrier members are actually magazines for a device for applying the traveler split rings to spinning rings, it is necessary that all traveler split rings are beaded on the carrier members 8 in positions in which their ends, and the openings between the ends, are aligned. All traveler split rings R must be beaded on the carrier members in the position shown in Fig. 4, while angularly displaced traveler split rings, for instance a traveler split ring in the position shown in Fig. 6, must be prevented from sliding down the guiding member and the carrier member.

A rotary stripping member 10 is provided for this purpose which has a projecting portion 9, best seen in Figs. 3 to 6. The projecting portion 9 slides during rotation of the stripping member 10 in the direction of the arrow 20 along the guiding members 7 and toward the pointed end of the same. As will be best seen from Figs. 4 and 6, only traveler split rings in the position shown in Fig. 4 will pass the projection 9 while sliding down the pointed guiding member, while traveler split rings in the angularly displaced position shown in Fig. 6 will be engaged by the projection 9 and lifted off the guiding member.

As traveler split rings are dropped from the discharge portion 5', some will be caught on the pointed ends of the guiding members, and such traveler split rings which are in the proper position shown in Fig. 4 will slide down the guiding members 7 and will be beaded on the carrier members 8. Some traveler split rings will fall onto the guiding members in the improper position shown in Fig. 6 and be stripped off the guiding members to drop together with the traveler split rings which were not caught at all by the guiding members 7. Underneath the discharge portion 5', the stripping members 9, 10 and the pointed ends of the guiding members 7, a chute 11 is arranged which receives the traveler split rings not caught in proper position by the guiding members 7.

Conveyer means are provided for returning the traveler split rings to the supply means 4, 5. An endless conveyer belt 12 which moves in the direction of the arrow 13 passes over the rollers 14, 15 and 16 and is preferably driven from the shaft 3.

A transmission means comprising a belt 17 and pulleys connected for rotation to the roller 15 and to the rotary stripping members 9, 10 effects rotation of the rotary stripping members 9, 10.

Underneath the upper delivery portion of the conveyer means 12, the inclined chute 21 is arranged which has a lower portion projecting into the drum so that traveler split rings deposited by the chute 11 on the lower receiving portion of the conveyer means 12 are dropped by the conveyer belt onto the upper portion of the chute 21 and pass into the interior of the hollow drum 2, from where they drop through the slots 2 onto the supply table 5 for repeated discharge over the discharge portion 5'.

The apparatus operates as follows:

The traveler split rings are placed as a mass in the drum 2 which is rotated either manually or by suitable drive means, not shown. Traveler split rings are distributed onto the supply table 5 and slide down the vibrating supply table until they drop over the lower edge of the same. Some traveler split rings are caught by the guiding members 7 in proper position, as shown in Fig. 4, and are beaded on the carrier members 8, the bracket 18 being narrow and passing between the ends of the traveler split rings when the same are in proper position.

Figure 5:
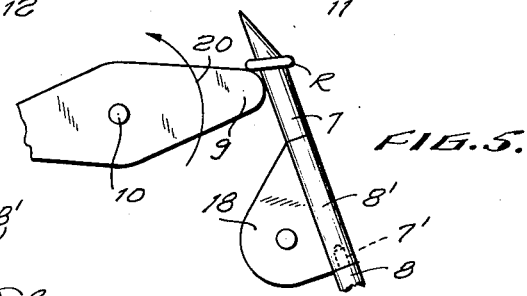
Fig. 5 is a front view corresponding to Fig. 3 and showing another operational position.
Figure 6:
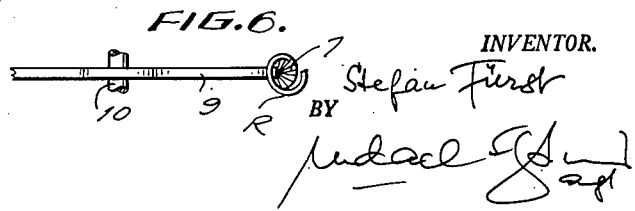
Fig. 6 is a plan view to Fig. 5.

The traveler split rings which are caught in an improper angularly displaced position are engaged by the projection 9 of the rotary stripping members, as shown in Figs. 5 and 6, and drop on the chute 11 together with traveler split rings which have missed the pointed ends of the guiding members 7. The conveyer means 14, 15, 16, and 12 return dropped traveler split rings through the chute 21 to the supply means 2, 5.

In the illustrated embodiment, guiding members 7 are used which have a cross-sectional shape corresponding to the shape of the traveler split rings, and to the cross-sectional shape of the carrier members. Consequently, the traveler split rings which are improperly positioned will get stuck on the guiding members 7, as shown in Figs. 5 and 6 and will be easily removed by the stripping members 9, 10.

The guiding members 7 may be omitted, and in this event the elongated carrier members 8 are so supported that the upper ends thereof are located underneath the discharge portion 5' and catch traveler split rings as described with reference to the pointed guiding members 7.

It is also contemplated to use flat bar-shaped carrier members, and to arrange the same with their upper narrow edges underneath the discharge portion 5' in a substantially horizontal position, so that traveler split rings dropping onto the bar-shaped carrier members are caught on the upper narrow edges of the same.

It will be understood that each of the elements described above, or two or more together, may also find a useful application in other types of apparatus for attaching objects to a carrier member differing from the types described above.

While the invention has been illustrated and described as embodied in an apparatus for beading traveler split rings onto at least one elongated upright carrier member, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for beading traveler split rings onto an elongated carrier member, comprising, in combination, supply means having a discharge portion adapted to drop traveler split rings; supporting means for supporting at least one carrier member in a position in which the upper end of the carrier member is located underneath said discharge portion; and a rotary stripping member located underneath said discharge portion and having a projecting portion adapted to move during rotation in one direction along said elongated carrier member toward the upper end of the same so as to pass between the spaced ends of traveler split rings located in a predetermined position on said carrier member, and so as to engage and lift off traveler split rings caught in another position.

2. Apparatus for beading traveler split rings onto an elongated carrier member, comprising, in combination, a hollow rotary drum formed with a plurality of outlet openings and adapted to discharge traveler split rings contained therein through said outlet openings; an inclined supply table having a higher portion located underneath said hollow rotary drum and a lower portion constituting a discharge portion for dropping traveler split rings received from said rotary drum; supporting means for supporting at least one carrier member in a position in which the upper end of the carrier member is located underneath said discharge portion; a rotary stripping member located underneath said discharge portion and having a projecting portion adapted to move during rotation in one direction along said elongated carrier member toward the upper end of the same so as to pass between the spaced ends of traveler split rings located in a predetermined position on said carrier member, and so as to engage and lift off traveler split rings caught in another position; conveyer means having a lower receiving portion located underneath said discharge portion of said supply means and underneath said rotary stripping member and a higher delivery portion located above said hollow rotary drum, said conveyer means being adapted to transport traveler split rings dropped onto said lower receiving portion back to said hollow rotary drum so that traveler split rings which are not caught in said predetermined position on said carrier member are returned to said hollow rotary drum for repeated discharge therefrom.

3. Apparatus for beading traveler split rings onto an elongated carrier member, comprising, in combination, supply means having a discharge portion adapted to drop traveler split rings; supporting means for supporting at least one carrier member in an upright position; at least one upright guiding member having a pointed upper end located underneath said discharge portion and a lower end adapted to be aligned with the upper end of the carrier member; a rotary stripping member having a projecting portion moving during rotation in one direction along said pointed guiding member and toward said pointed end of the same, said projecting portion being adapted to pass between the spaced ends of a traveler split ring located in a predetermined position on said guiding member, and adapted to engage and lift off said pointed end traveler split rings caught thereon in another position; conveyor means having a lower receiving portion located underneath said discharge portion of said supply means and said pointed end of said guiding member, and a higher delivery portion located above said supply means, said conveyer means being adapted to transport traveler split rings dropped onto said lower receiving portion back to said supply means so that traveler split rings which are not caught in said predetermined position on said guiding member are returned to said supply means for repeated discharge therefrom.

4. Apparatus for beading traveler split rings onto an elongated carrier member, comprising, in combination, supply means having a discharge portion adapted to drop traveler split rings; supporting means for supporting at least one carrier member in an upright position; at least one upright guiding member having a pointed upper end located underneath said discharge portion and a lower end adapted to be aligned with the upper end of the carrier member; a rotary stripping member having a projecting portion moving during rotation in one direction along said pointed guiding member and toward said pointed end of the same, said projecting portion being adapted to pass between the spaced ends of a traveler split ring located in a predetermined position on said guiding member, and adapted to engage and lift off said pointed end traveler split rings caught thereon in another position; an endless conveyer belt having a lower receiving portion located below said discharge portion and said pointed end of said guiding member, and a higher delivery portion; a first chute having a higher end portion located underneath said discharge portion and a lower end portion located above said lower receiving portion of said conveyer belt; a second chute having a higher end portion located underneath said delivery portion of said conveyer belt and a lower end portion located above said supply means so that traveler split rings which are not caught in said predetermined position by said guide member drop onto said first chute, and are transported by said conveyer belt to said second chute from where they are guided to said supply means for repeated discharge therefrom.

5. Apparatus for beading traveler split rings onto an elongated carrier member, comprising, in combination, a hollow rotary drum formed with a plurality of outlet openings and adapted to discharge traveler split rings contained therein through said outlet openings; an inclined supply table having a higher portion located underneath said hollow rotary drum and a lower portion constituting a discharge portion for dropping traveler split rings received from said rotary drum; vibrator means for vibrating said inclined supply table; supporting means for supporting at least one carrier member in an upright position; at least one upright guiding member having a pointed upper end located underneath said discharge portion and a lower end adapted to be aligned with the upper end of the carrier member; a rotary stripping member having a projecting portion moving during rotation in one direction along said pointed guiding member and toward said pointed end of the same, said projecting portion being adapted to pass between the spaced ends of a traveler split ring located in a predetermined position on said guiding member, and adapted to engage and lift off said pointed end traveler split rings caught thereon in another position; conveyer means having a lower receiving portion located underneath said discharge portion of said hollow rotary drum and said pointed end of said guiding member, and a higher delivery portion located above said hollow rotary drum, said conveyer means being adapted to transport traveler split rings dropped onto said lower receiving portion back to said hollow rotary drum so that traveler split rings which are not caught in said predetermined position on said guiding member are returned to said hollow rotary drum for repeated discharge therefrom.

6. Apparatus for beading traveler split rings onto an elongated carrier member, comprising, in combination, a hollow rotary drum formed with a plurality of outlet openings and adapted to discharge traveler split rings contained therein through said outlet openings; an inclined supply table having a higher portion located underneath said hollow rotary drum and a lower portion constituting a discharge portion for dropping traveler split rings received from said rotary drum; vibrator means for vibrating said inclined supply table; supporting means for supporting at least one carrier member in an upright position; at least one upright guiding member having a pointed upper end located underneath said discharge portion and a lower end adapted to be aligned with the upper end of the carrier member; a rotary stripping member having a projecting portion moving during rotation in one direction along said pointed guiding member and toward said pointed end of the same, said projecting portion being adapted to pass between the spaced ends of a traveler split ring located in a predetermined position on said guiding member, and adapted to engage and lift off said pointed end traveler split rings caught thereon in another position; an endless conveyer belt having a lower receiving portion located below said discharge portion and said pointed end of said guiding member, and a higher delivery portion; a drive roller for driving said conveyer belt; transmission means connecting said drive roller with said rotary member for rotating the latter; a first chute having a higher end portion located underneath said discharge portion and a lower end portion located above said lower receiving portion of said conveyer belt; and a second chute having a higher end portion located underneath said delivery portion of said conveyer belt and a lower end portion located in said hollow rotary drum so that traveler split rings which are not caught in said predetermined position by said guide member drop onto said first chute, and are transported by said conveyer belt to said second chute from where they are guided to said hollow rotary drum for repeated discharge therefrom.

7. In an apparatus for beading traveler split rings onto an elongated carrier member, in combination, means for supporting at least one elongated carrier member in upright position; means for dropping traveler split rings onto the upper end of said elongated carrier member; a rotary stripping member including a projecting portion adapted to move during rotation in one direction along said elongated carrier member toward the upper end of the same and to pass between the spaced ends of traveler split rings caught on said carrier member in a predetermined position, and adapted to engage and lift off traveler split rings caught in another position.

8. In an apparatus for beading traveler split rings onto an elongated carrier member, in combination, means for supporting at least one elongated carrier member in upright position; at least one upright guiding member having a pointed upper end and a lower end adapted to be aligned with the upper end of the elongated carrier member; means for dropping traveler split rings onto said pointed upper end of said guiding member; a rotary stripping member including a projecting portion adapted to move during rotation in one direction along said guiding member and toward said pointed end of the same and to pass between the spaced ends of traveler split rings caught on said guiding member in a predetermined position, and adapted to engage and lift off traveler split rings caught in another position.

9. A method for beading traveler split rings having spaced ends onto an elongated carrier member, comprising, in combination, the steps of dropping the traveler split rings onto the upper end of an upright carrier member; and moving a stripping member along the carrier member towards its upper end in a plane passing through said carrier member so that traveler split rings whose spaced ends are located on both sides of said plane are retained on said carrier member, while traveler split rings caught on said carrier member in angularly displaced positions are lifted off said carrier member.

10. Apparatus for beading split rings having spaced ends, comprising, in combination, a downwardly inclined supply table having an upper portion adapted to be supplied with split rings and a lower discharge edge portion adapted to freely drop split rings; at least one upright rod having an upper end located immediately below said discharge edge portion so that split rings dropping from said lower discharge edge portion are beaded on said upright rod and stripper means located adjacent the upper end of said rod in a plane passing through the center of said rod for blocking beading of split rings having both ends thereof located on the same side of said plane.

11. Apparatus for beading split rings comprising, in combination, a downwardly inclined supply table having an upper portion and a lower elongated discharge edge portion adapted to freely drop split rings; a supply member located above said upper portion of said inclined supply table for scattering split rings in spaced positions onto said upper portion of said supply table; and a row of upright rods spaced along said discharge edge portion each upright rod having an upper end located immediately below said discharge edge portion so that spaced split rings dropping from said lower discharge edge portion are beaded on said upright rods.

12. Apparatus for beading split rings comprising, in combination, a downwardly inclined supply table having an upper portion and a lower discharge edge portion adapted to freely drop split rings; a rotary supply member formed with a plurality of outlet slots located above said upper portion of said inclined supply table and adapted to supply during rotation thereof split rings contained therein through said outlet slots in spaced positions to said upper portion of said supply table so that the supplied split rings slide spaced from each other toward said discharge edge portion and reach the same at spaced intervals; and at least one upright rod having an upper end located immediately below said discharge edge portion so that spaced split rings dropping from said lower discharge edge portion are beaded on said upright rod.

13. Apparatus for beading split rings comprising, in combination, a downwardly inclined supply table having an upper portion adapted to be supplied with split rings and a lower discharge edge portion adapted to freely drop split rings; at least one upright rod having an upper end located underneath and spaced from said discharge edge portion so that split rings dropping from said lower discharge edge portion are beaded on said upright rod; and a narrow stripping member located underneath said discharge edge portion and having a thickness smaller than the thickness of said upright rod, said stripping member extending in a plane passing through the center of said rod and being located adjacent said upper end of the same, said stripping member being adapted to be located between the spaced ends of split rings dropping in a predetermined position on said rod and adapted to block beading of split rings dropping in any other position.

References Cited in the file of this patent

UNITED STATES PATENTS

| | | |
|---|---|---|
| Re. 17,104 | Schoenberger | Oct. 16, 1928 |
| 2,295,469 | Hall et al. | Sept. 8, 1942 |